United States Patent [19]

Norbäck

[11] 4,162,934

[45] Jul. 31, 1979

[54] METHOD OF PRODUCING SORPTION BODIES

[75] Inventor: Per Norbäck, Lidingo, Sweden

[73] Assignee: Aktiebolaget Carl Munters, Sollentuna, Sweden

[21] Appl. No.: 845,433

[22] Filed: Oct. 25, 1977

[30] Foreign Application Priority Data

Oct. 26, 1976 [SE] Sweden ............... 7611888

[51] Int. Cl.$^2$ .................. C04B 43/04; D21D 3/00
[52] U.S. Cl. ................... 162/155; 162/153; 162/181 C; 162/181 D
[58] Field of Search ............ 162/155, 153, 181 C, 162/181 D

[56] References Cited

U.S. PATENT DOCUMENTS

| | | | |
|---|---|---|---|
| 3,231,409 | 1/1966 | Munters | 162/155 |
| 3,266,973 | 8/1966 | Crowley | 162/181 C |
| 3,382,141 | 5/1968 | Arledter | 162/181 C |
| 3,434,864 | 3/1969 | Haden et al. | 162/169 |
| 3,800,515 | 4/1974 | Asker | 162/181 C |

FOREIGN PATENT DOCUMENTS

| | | |
|---|---|---|
| 2429550 | 1/1975 | Fed. Rep. of Germany . |
| 2511578 | 10/1975 | Fed. Rep. of Germany . |
| 350329 | 10/1972 | Sweden . |
| 381250 | 12/1975 | Sweden . |

*Primary Examiner*—Joseph Scovronek
*Assistant Examiner*—C. Konkol
*Attorney, Agent, or Firm*—John A. Mitchell; Pasquale A. Razzano

[57] ABSTRACT

A method of producing a sorption body is disclosed in which a plurality of sheets of asbestos paper are formed from a fiber pulp having molecular sieves placed therein. The sheets are arranged in contact with one another at spaced points to form transectional channels therebetween for the media which are to pass through the body, with the sheets supporting each other. The assembled sheets are subjected to an increase in temperature sufficient to drive off the organic binding agents present in the paper and to break down the asbestos fiber to a powdery consistency.

2 Claims, No Drawings

METHOD OF PRODUCING SORPTION BODIES

The present invention relates to a method of producing a sorption body in which sheets of asbestos paper are arranged on each other so that they internally support each other at separate points thereby forming transectional channels for media which are to pass through the body; the asbestos then having one or more inorganic constituents precipitated onto it to increase the strength of the body.

These types of bodies are primarily intended to be used in connection with regenerative moisture exchangers for drying air or other gases, one section of the body having the working air which is to be dried passing through it and a current of regenerating heated gas (air) being passed through another separate section. Another area of use for sorption bodies is in ventilation heat exchangers which have fresh air for introduction into a premises passing through one side and through the other side the used exhaust air from the premises is expelled. During this process moisture and heat are transferred between the two currents of air e.g. so that in the winter the exhaust air provides the incoming fresh air with moisture and heat.

The present invention, however, can also be used to remove substances other than steam from air or other gases, as in the purification of air of environmentally-damaging gases.

The process is known, e.g. from the Swedish patent letter No. 381 250, of heating up the sorption or exchanger body, produced as described above, to a temperature at which the organic binding agent in the asbestos is burnt off with the aim of rendering the body fireproof. Heat exchangers are heated using this known process to such a high temperature that the asbestos fibres give off the hygroscopic water they contain and change into powder form, thereafter the body is held together by the normally highly insoluble lattice formed by a stiffening substance or substances. The body's hardness and strength can be further increased by a subsequent precipitation on the sheets of another coating of e.g. an inorganic substance.

A sorption body produced in this manner has a high porosity despite the asbestos being converted to other forms in parallel with the sintering of the substances added. For this reason the exchanger body finally obtained is an excellent bearer of hygroscopic substances in the form of water-soluble salts such as lithium chloride, but on the other hand it cannot subsequently take up solid powdery sorption substances in the quantities necessary to enable the sorption body to reach the required moisture transference capacity.

It is known (Swedish patent letter No. 350 329) that the so-called molecular sieve can be used as the hygroscopic substance in moisture exchangers. These sieves can be made using synthetically produced, crystaline metallic aluminium silicate and can be activated for adsorption by removing their inherent water. Such molecular sieves have a very fine porosity and possess a strong affinity for water. In this well-known process the molecular sieve is immersed in the fibre suspension from which the asbestos paper is produced. Once this asbestos paper containing the molecular sieve has been fashioned into an exchanger body with fine, transectional channels, the body is heated up to such a high temperature that the organic binding agents in the asbestos paper are burnt off. The temperature is in the range of 400°–500° C.

The present invention has now shown that the molecular sieves that are already mixed in the fibre pulp which is used to produce the asbestos paper cannot, once the sorption body has been constructed, only be heated up to the relatively low temperature at which the organic binding agents become oxidized and burn off but can also tolerate the considerably higher temperature at which the asbestos fibres are converted to an amorphous form. The high temperature could in itself be expected to have a detrimental effect on the properties of the molecular sieves as it is greatly in excess of the normal temperature to which the sieves should be exposed during regeneration. Moreover, it could be expected that the sintering process would cause the molecular sieve's fine pores to become blocked thereby completely eliminating the adsorption of moisture. It has, however, surprisingly been found that despite the high temperature the molecular sieves retain their moisture adsorbing ability to a great extent. By the fine molecular sieve powder being, according to this invention, embedded in the sorption body's final latticework, a sufficiently large amount of powder can be applied to the lattice so that individual particles remain exposed to the surrounding air enabling them to carry out their function as moisture adsorbers. The quantity of molecular sieves can reach 50% with 75 and 25% as the upper and lower limits, calculated on the weight of the paper's fibre.

A particularly suitable embodiment involves the sorption body being composed of sheets of asbestos with every other one being corrugated and every other one flat, thereby providing support for each other along the ridges of the corrugations so that the body becomes filled with parallel transectional channels. The distance between the flat sheets should preferably not exceed 3 mm and optimally be around 1.5 mm. The exchanger body can be executed in the form of a cylindrical rotor moving in a closed path between two passages in an enclosed casing, the rotor having both the gaseous media such as the currents of air passing through it, the longitudinal direction of the channels running parallel to the axis of rotation. The coating precipitated on the molecular sieve-filled asbestos sheets can be formed, as is known, by impregnation of two water soluble substances which react with each other, such as a solution of sodium silicate and calcium chloride which together produce a highly insoluble precipitation of calcium and silicon compounds on the sheets and fibres respectively. The insoluble precipitation can also be silicon dioxide, the sheets being impregnated by a sodium silicate solution and an acid that together form a gel which when the temperature is increased converts to highly water soluble silicon dioxide. Not before this has been performed is the exchanger body to be heated to a temperature of preferably 400°–500° C. which drives off the organic constituents in the asbestos sheets. The body is then heated further to a temperature of 700°–800° C. at which the asbestos fibres are converted to an almost powdered consistency.

The upper limit of this temperature is determined by the fact that the molecular sieves must remain intact and neither they nor the precipitated substances should melt, so destroying the structure of the body. It is imaginable that the final temperature will be such that the substance or substances precipitated on the sheets will be effected in such a way that a hard, continuous skeleton will be formed which without further treatment will provide the body with the requisite firmness and strength.

According to this invention a rotor can be produced in the following manner:

One sheet of corrugated and one sheet of flat asbestos paper which contains 50% molecular sieves by weight are placed one on top of the other to form a strip. The height of the corrugations are 1.5 mm approx. and the sheets are glued together along the ridges of the channels formed by the corrugations. The strip is then wound spirally to form a cylindrical rotor in which the corrugations run parallel with the axis of rotation. The rotor is immersed in sodium silicate with a specific weight of 1.20 g/cm³ and then in ethyl alcohol with a specific weight of 0.89. In the next step the rotor is boiled in a 40% calcium chloride solution at 110° C. for at least 0.5 hours, thereby obtaining a coating of calcium silicate on the asbestos sheets. After drying the rotor is carefully heated up to 475° C. in order to remove the organic binding agents present in the asbestos paper. The rotor is then baked at 760°-770° C. which reduces the asbestos to a powder. Then follows further treatment with a solution of sodium silicate, alcohol and calcium chloride solution as above in order to obtain a second coating of calcium silicate on the rotor's surface.

Comparative experiments have been made on a rotor produced using the above method and a "standard" rotor using the best embodiment manufactured by the assignee hereof, i.e. a rotor with the same geometric form but with the sheets consisting of waterproof treated asbestos paper which is provided with its hygroscopic properties by impregnating it with a solution of lithium chloride. Both rotors had the working air which is to be dried and the regenerating air passed through them under exactly the same conditions. The temperature of the regenerating air was relatively high, namely in the range of 150° C. and the ratio between the two currents of air was 1:1. It was found that the drying effect was approximately the same in that the absolute moisture content of the working air was reduced from an inlet value of 12 g/kg air to a state of 3.0 g/kg. The number of rotations of the rotor was 10 per hour and their depth in the rotor's axial direction was 0.2 m. The result is highly surprising as up to the present it has not been considered possible to heat molecular sieves up to the high temperature mentioned when producing a sorption body.

Molecular sieves can be produced with the desired porosity enabling a gas of a specific given molecular size to be adsorbed without, however, adsorbing other gases present in the gas mixture. This enables this invention to be used for e.g. removing environmentally damaging or foul-smelling gases, such as hydrogen sulphide, from the air.

I claim:

1. The method of producing a sorption body comprising the steps of forming sheets of asbestos paper from asbestos fibre pulp having molecular sieves placed therein; arranging the sheets in contact with each other at spaced points to form transectional channels therebetween for the media which are to pass through the body with the sheets supporting each other; subjecting the sheets to an increase in temperature sufficient to drive off the organic binding agents present in the paper and to break down the asbestos fibre into an amorphous product; said step of subjecting the sheet to an increase in temperature comprising the steps of subjecting the sheets first to a temperature of between 400° C. and 500° C. to burn off the organic constituents of the asbestos sheets and then heating the sheets to a temperature of between 700° C. and 800° C. to convert the asbestos fibres to a powdery consistency; and thereafter applying a further stiffening coating of at least one, preferably inorganic, constituent by precipitating the coating onto the sheets.

2. The method of claim 1, including the step of mixing said molecular sieves into the fibre pulp of which the asbestos paper is produced in such quantities that it reaches at least 25% by weight of the completed paper.

* * * * *